United States Patent
Luo et al.

(10) Patent No.: US 9,510,235 B2
(45) Date of Patent: Nov. 29, 2016

(54) CONGESTION CONTROL METHOD, DEVICE, AND SYSTEM

(71) Applicant: Huawei Technologies Co., Ltd., Shenzhen, Guangdong (CN)

(72) Inventors: Wujun Luo, Beijing (CN); Yuan Xia, Beijing (CN); Qingchun Lin, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 191 days.

(21) Appl. No.: 14/476,209

(22) Filed: Sep. 3, 2014

(65) Prior Publication Data

US 2014/0369203 A1 Dec. 18, 2014

Related U.S. Application Data

(63) Continuation of application No. PCT/CN2012/071975, filed on Mar. 6, 2012.

(51) Int. Cl.
| | |
|---|---|
| *H04W 28/02* | (2009.01) |
| *H04L 29/08* | (2006.01) |
| *H04W 64/00* | (2009.01) |
| *H04L 12/815* | (2013.01) |

(52) U.S. Cl.
CPC .......... *H04W 28/0289* (2013.01); *H04L 67/18* (2013.01); *H04W 28/0226* (2013.01); *H04W 64/00* (2013.01); *H04L 47/22* (2013.01)

(58) Field of Classification Search
CPC ........... H04W 28/0289; H04W 28/02; H04W 28/0284; H04W 64/00; H04W 4/02; H04W 4/025; H04W 28/0226; H04W 40/20; H04W 48/04; H04L 12/2472; H04L 12/569; H04L 47/11; H04L 47/115; H04L 47/12; H04L 47/22; H04L 9/0872; H04L 67/18
See application file for complete search history.

(56) References Cited

U.S. PATENT DOCUMENTS 8,023,479 B2 * 9/2011 Silver ................. H04L 65/1016
370/338
8,326,306 B2 * 12/2012 Zhao ..................... H04W 60/04
370/338

(Continued)

FOREIGN PATENT DOCUMENTS

| CN | 1442979 A | 9/2003 |
|---|---|---|
| CN | 101163111 A | 4/2008 |

(Continued)

OTHER PUBLICATIONS

"Broadcasting MTC Access Control for Overload Control, Time Controlled and Device Triggers", Sierra Wireless, 3GPP TSG SA WG2 Meeting #79, May 10-14, 2010, 4 pages.

(Continued)

*Primary Examiner* — Warner Wong

(57) ABSTRACT

Embodiments of the present invention provide a congestion control method, a device, and a system. In the embodiments of the present invention, because a gateway device, unlike a gateway device that performs congestion control on all user equipments by using a same control policy in the prior art, performs congestion control on a user equipment according to a real-time location of the user equipment and a real-time congestion situation of a location region in which the user equipment is camping, thereby improving flexibility and accuracy of congestion control.

18 Claims, 3 Drawing Sheets

(56) References Cited

U.S. PATENT DOCUMENTS

| | | | |
|---|---|---|---|
| 8,493,860 B2* | 7/2013 | Racz | H04L 47/12 370/233 |
| 2003/0174689 A1 | 9/2003 | Fujino | |
| 2003/0228871 A1* | 12/2003 | Bernhard | H04W 28/08 455/452.2 |
| 2005/0282571 A1* | 12/2005 | Oprescu-Surcobe | H04W 28/10 455/503 |
| 2006/0128371 A1* | 6/2006 | Dillon | H04W 24/00 455/423 |
| 2006/0142035 A1 | 6/2006 | Bahl et al. | |
| 2008/0130493 A1 | 6/2008 | Kanauchi et al. | |
| 2009/0075665 A1 | 3/2009 | Gogic | |
| 2010/0061324 A1 | 3/2010 | Liao et al. | |
| 2011/0280130 A1 | 11/2011 | Foottit et al. | |
| 2012/0230186 A1* | 9/2012 | Lee | H04L 43/028 370/230 |
| 2013/0016608 A1* | 1/2013 | Tiwari | H04W 4/22 370/230 |
| 2014/0369197 A1* | 12/2014 | Stenfelt | H04W 28/0289 370/235 |

FOREIGN PATENT DOCUMENTS

| | | |
|---|---|---|
| CN | 101170488 A | 4/2008 |
| CN | 102075898 A | 5/2011 |
| CN | 102104908 A | 6/2011 |
| EP | 2 645 764 A1 | 10/2013 |
| RU | 2319311 C2 | 3/2008 |
| RU | 2443080 C2 | 2/2012 |
| WO | WO 2010/136070 A1 | 12/2010 |

OTHER PUBLICATIONS

"Solution for Overload Control", Huawei, 3GPP TSG SA WG2 Meeting #79, May 10-14, 2010, 4 pages.

"Congestion control by GGSN/PGW", Huawei, 3GPP TSG SA WG2 Meeting #79, May 10-14, 2010, 3 pages.

* cited by examiner

CONGESTION CONTROL METHOD, DEVICE, AND SYSTEM

CROSS-REFERENCE TO RELATED APPLICATIONS

This application is a continuation of International Application No. PCT/CN2012/071975, filed on Mar. 6, 2012 which is hereby incorporated by reference in its entirety.

TECHNICAL FIELD

Embodiments of the present invention relate to communications technologies, and in particular, to a congestion control method, a device, and a system.

BACKGROUND

On a mobile broadband network, in order to provide end-to-end quality of service (Quality of Service, QoS) guarantee for a user equipment (User Equipment, UE), the network needs to perform policy and charging control on a mobile terminal according to certain service control rules. The foregoing service control rules may be classified into two types: one type is a dynamic or predefined rule, namely a PCC rule, under a policy and charging control (Policy and Charging Control, PCC) architecture; and the other type is a static rule when a PPC architecture does not exist. When congestion occurs on a mobile broadband network, a gateway device may perform congestion control on a UE according to an obtained rule and a service type, for example, discarding service packets of some services.

However, a gateway device performs congestion control on all UEs by using a same control policy (such as a PCC rule or a static rule), thereby resulting in relatively poor flexibility and accuracy of congestion control.

SUMMARY

Embodiments of the present invention provide a congestion control method, a device, and a system, so as to improve flexibility and accuracy of congestion control.

According to one aspect, a congestion control method is provided and includes:

receiving, by a gateway device, a data packet sent by an access network device, where the data packet includes location information of a user equipment and congestion status information of a location region in which the user equipment is camping; and performing, by the gateway device, congestion control on the user equipment according to the location information of the user equipment and the congestion status information of the location region in which the user equipment is camping.

According to another aspect, a congestion control method is provided and includes:

obtaining, by an access network device, location information of a user equipment and congestion status information of a location region in which the user equipment is camping; and sending, by the access network device, a data packet to a gateway device, where the data packet includes the location information of the user equipment and the congestion status information of the location region in which the user equipment is camping, so that the gateway device performs congestion control on the user equipment according to the location information of the user equipment and the congestion status information of the location region in which the user equipment is camping.

According to another aspect, a gateway device is provided and includes:

a receiving unit, configured to receive a data packet sent by an access network device, where the data packet includes location information of a user equipment and congestion status information of a location region in which the user equipment is camping; and a control unit, configured to perform congestion control on the user equipment according to the location information of the user equipment and the congestion status information of the location region in which the user equipment is camping.

According to another aspect, an access network device is provided and includes:

an obtaining unit, configured to obtain location information of a user equipment and congestion status information of a location region in which the user equipment is camping; and a sending unit, configured to send a data packet to a gateway device, where the data packet includes the location information of the user equipment and the congestion status information of the location region in which the user equipment is camping, so that the gateway device performs congestion control on the user equipment according to the location information of the user equipment and the congestion status information of the location region in which the user equipment is camping.

According to another aspect, a congestion control system is provided and includes the foregoing gateway device and the foregoing access network device.

It can be known from the foregoing technical solutions, in the embodiments of the present invention, because a gateway device, unlike a gateway device that performs congestion control on all user equipments by using a same control policy in the prior art, performs congestion control on a user equipment according to a real-time location of the user equipment and a real-time congestion situation of a location region in which the user equipment is camping, thereby improving flexibility and accuracy of congestion control.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show some embodiments of the present invention, and a person of ordinary skill in the art may still derive other drawings from these accompanying drawings without creative efforts.

DETAILED DESCRIPTION

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

The technical solutions provided by the embodiments of the present invention are applicable to a plurality of radio access networks, for example, an Evolved Universal Mobile Telecommunications System (Universal Mobile Telecommunication System, UMTS) terrestrial radio access network (Evolved Universal Mobile Telecommunication System Territorial Radio Access Network, E-UTRAN), a UMTS terrestrial radio access network (UMTS Territorial Radio Access Network, UTRAN), and a Global System for Mobile Communications (Global System for Mobile Communications, GSM)/Enhanced Data rates for GSM Evolution (Enhanced Data rate for GSM Evolution, EDGE) radio access network (GSM EDGE Radio Access Network, GERAN).

An access network device may be an evolved NodeB (Evolved NodeB, eNB) or a home evolved NodeB (Home Evolved NodeB, HeNB) in the E-UTRAN, may also be a radio network controller (Radio Network Controller, RNC) in the UTRAN, or may also be a base station controller (Base Station Controller, BSC) in the GERAN.

A gateway device may be a packet data network gateway (Packet Data Network Gateway, PGW) in the E-UTRAN, or may also be a network element such as a gateway general packet radio service (General Packet Radio Service, GPRS) support node (Gateway GPRS Supporting Node, GGSN) in the UTRAN/GERAN.

A mobility management network element may be a mobility management entity (Mobility Management Entity, MME) in the E-UTRAN, or may also be a network element such as a serving GPRS support node (Serving GPRS Support Node, SGSN) in the UTRAN/GERAN.

Figure 1:
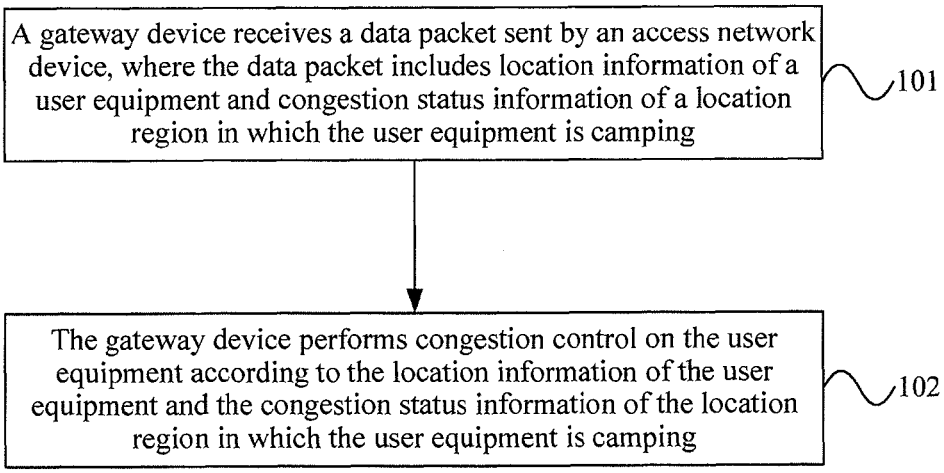
FIG. 1 is a schematic flowchart of a congestion control method according to an embodiment of the present invention.

FIG. 1 is a schematic flowchart of a congestion control method according to an embodiment of the present invention. As shown in FIG. 1, the congestion control method in this embodiment may include:

101: A gateway device receives a data packet sent by an access network device, where the data packet includes location information of a user equipment and congestion status information of a location region in which the user equipment is camping.

The location region in which the user equipment is camping may include but is not limited to a cell, a cell group, a location area, a routing area, or a tracking area.

102: The gateway device performs congestion control on the user equipment according to the location information of the user equipment and the congestion status information of the location region in which the user equipment is camping.

It should be noted that, that the gateway device performs congestion control on the user equipment may be specifically that, according to the technical solution in the prior art, the gateway device performs congestion control according to user information of the user equipment or a type of a service packet of the user equipment, for example, limiting peer-to-peer (Peer-to-Peer, P2P) bandwidth, and reducing a rate of a low-priority user.

It may be understood that, after performing 101 each time, the gateway device may record the location information of the user equipment and the congestion status information of the location region in which the user equipment is camping. For a user equipment, after performing 101-102 for the first time, the gateway device may determine whether a location of the user equipment changes. If the location changes, the gateway device continues to perform 101-102; and if the location does not change, 101 does not need to be performed, and the gateway device may directly perform 102 according to the recorded location information of the user equipment and the congestion status information of the location region in which the user equipment is camping.

In an optional implementation manner of this embodiment, the gateway device may specifically obtain a control policy corresponding to the location information of the user equipment according to the location information of the user equipment; then, the gateway device may determine, according to the control policy and congestion status information of a cell in which the user equipment is camping, control information corresponding to the congestion status information of the cell in which the user equipment is camping; and finally, the gateway device further performs congestion control on the user equipment according to the control information.

In this embodiment, a gateway device receives a data packet sent by an access network device, where the data packet includes location information of a user equipment and congestion status information of a location region in which the user equipment is camping, so that the gateway device can perform congestion control on the user equipment according to the location information of the user equipment and the congestion status information of the location region in which the user equipment is camping. Because the gateway device, unlike a gateway device that performs congestion control on all user equipments by using a same control policy in the prior art, performs congestion control on the user equipment according to a real-time location of the user equipment and a real-time congestion situation of the location region in which the user equipment is camping, thereby improving flexibility and accuracy of congestion control.

Figure 2:
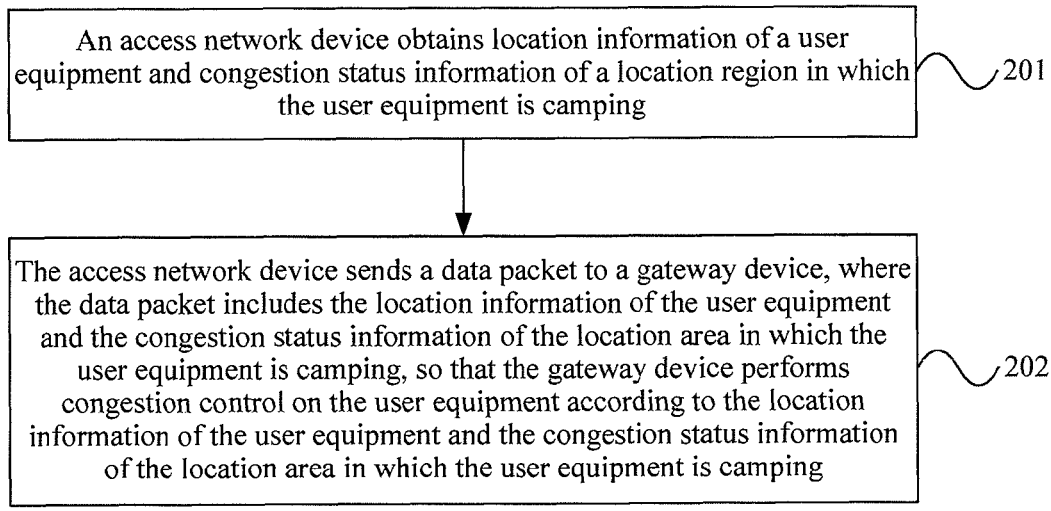
FIG. 2 is a schematic flowchart of a congestion control method according to another embodiment of the present invention.

FIG. 2 is a schematic flowchart of a congestion control method according to another embodiment of the present invention. As shown in FIG. 2, the congestion control method in this embodiment may include:

201: An access network device obtains location information of a user equipment and congestion status information of a location region in which the user equipment is camping.

202: The access network device sends a data packet to a gateway device, where the data packet includes the location information of the user equipment and the congestion status information of the location region in which the user equipment is camping, so that the gateway device performs congestion control on the user equipment according to the location information of the user equipment and the congestion status information of the location region in which the user equipment is camping.

The location region in which the user equipment is camping may include but is not limited to a cell, a cell group, a location area, a routing area, or a tracking area.

In an optional implementation manner of this embodiment, the gateway device may specifically obtain a control policy corresponding to the location information of the user equipment according to the location information of the user equipment; then, the gateway device may determine, according to the control policy and congestion status information of a cell in which the user equipment is camping, control information corresponding to the congestion status information of the cell in which the user equipment is camping; and finally, the gateway device further performs congestion control on the user equipment according to the control information.

In this embodiment, an access network device sends a data packet to a gateway device, where the data packet includes location information of a user equipment and congestion status information of a location region in which the user equipment is camping, so that the gateway device can perform congestion control on the user equipment according to the location information of the user equipment and the congestion status information of the location region in which the user equipment is camping. Because the gateway device, unlike a gateway device that performs congestion control on all user equipments by using a same control policy in the prior art, performs congestion control on the user equipment according to a real-time location of the user equipment and a real-time congestion situation of the location region in which the user equipment is camping, thereby improving flexibility and accuracy of congestion control.

Figure 3:
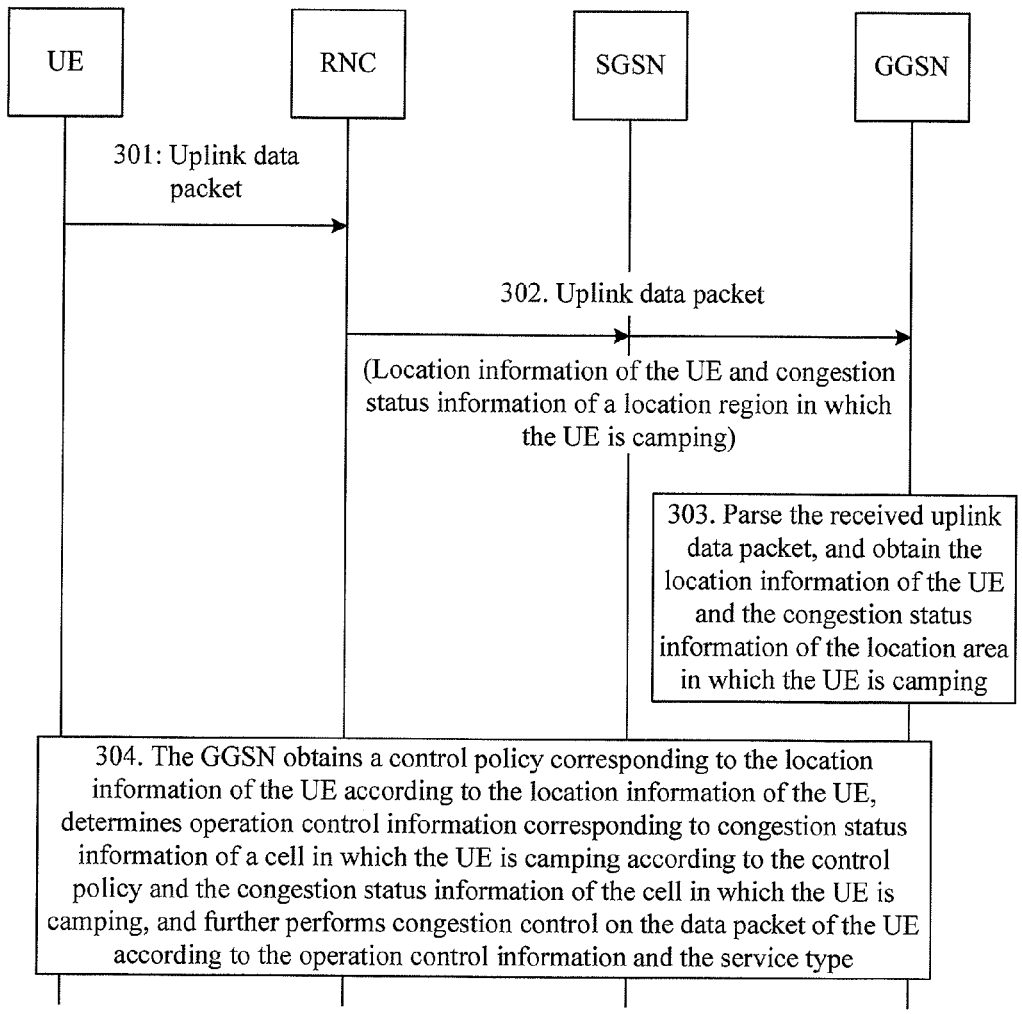
FIG. 3 is a schematic flowchart of a congestion control method according to another embodiment of the present invention.

To make the method provided in the embodiments of the present invention clearer, the following uses a UTRAN as an example. FIG. 3 is a schematic flowchart of a congestion control method according to still another embodiment of the present invention. As shown in FIG. 3, the congestion control method in this embodiment may include:

301: A UE sends an uplink data packet to an RNC.

302: The RNC carries location information of the UE and congestion status information of a location region in which the UE is camping in the uplink data packet, and sends the data packet to a GGSN and by using an SGSN.

303: The GGSN parses the received uplink data packet, and obtains the location information of the UE and the congestion status information of the location region in which the UE is camping.

304: The GGSN obtains a control policy corresponding to the location information of the UE according to the location information of the UE, determines control information corresponding to congestion status information of a cell in which the UE is camping according to the control policy and the congestion status information of the cell in which the UE is camping, and further performs congestion control on the data packet of the UE according to the control information and the service type.

For example, that the GGSN performs congestion control on a service packet of the UE may be that the GGSN performs congestion control on all services or different services within the location region, or may also be that the GGSN performs congestion control on all services or different services of a part of users within the location region, which is not limited in this embodiment.

It should be noted that, in an optional implementation manner of this embodiment, the SGSN may further make all user equipments within a same location region access a same GGSN. In this way, overall policy control may be performed on a whole location region.

In this embodiment, a GGSN receives an uplink data packet sent by an RNC, where the uplink data packet includes location information of a UE and congestion status information of a location region in which the UE is camping, so that the GGSN can perform congestion control on the UE according to the location information of the UE and the congestion status information of the location region in which the UE is camping. Because the GGSN, unlike a GGSN that performs congestion control on all UEs by using a same control policy in the prior art, performs congestion control on the UE according to a real-time location of the UE and a real-time congestion situation of the location region in which the UE is camping, thereby improving flexibility and accuracy of congestion control.

It should be noted that, for ease of description, the foregoing method embodiments are described as a series of action combinations; however, a person skilled in the art should understand that the present invention is not limited to the described sequence of the actions, because according to the present invention, some steps may be performed in another sequence or performed simultaneously. In addition, a person skilled in the art should also understand that the embodiments described in the specification all belong to exemplary embodiments, and the involved actions and modules are not necessarily mandatory in the present invention.

In the foregoing embodiments, the description of each embodiment has its focus. For a part that is not described in detail in a certain embodiment, reference may be made to related descriptions in other embodiments.

Figure 4:
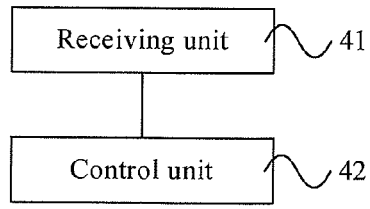
FIG. 4 is a schematic structural diagram of a gateway device according to another embodiment of the present invention.

FIG. 4 is a schematic structural diagram of a gateway device according to another embodiment of the present invention. As shown in FIG. 4, the gateway device in this embodiment may include a receiving unit 41 and a control unit 42. The receiving unit 41 is configured to receive a data packet sent by an access network device, where the data packet includes location information of a user equipment and congestion status information of a location region in which the user equipment is camping; and the control unit 42 is configured to perform congestion control on the user equipment according to the location information of the user equipment and the congestion status information of the location region in which the user equipment is camping.

The location region in which the user equipment is camping may include but is not limited to a cell, a cell group, a location area, a routing area, or a tracking area.

In an optional implementation manner of this embodiment, the control unit 42 may specifically obtain a control policy corresponding to the location information of the user equipment according to the location information of the user equipment; then determine, according to the control policy and congestion status information of a cell in which the user equipment is camping, control information corresponding to the congestion status information of the cell in which the user equipment is camping; and finally perform congestion control on the user equipment according to the control information.

In this embodiment, a gateway device receives, by using a receiving unit, a data packet sent by an access network device, where the data packet includes location information of a user equipment and congestion status information of a location region in which the user equipment is camping, so that a control unit can perform congestion control on the user equipment according to the location information of the user equipment and the congestion status information of the location region in which the user equipment is camping. Because the gateway device, unlike a gateway device that performs congestion control on all user equipments by using a same control policy in the prior art, performs congestion control on the user equipment according to a real-time location of the user equipment and a real-time congestion situation of the location region in which the user equipment is camping, thereby improving flexibility and accuracy of congestion control.

Figure 5:
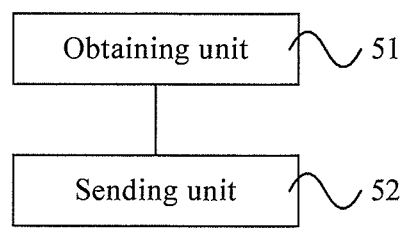
FIG. 5 is a schematic structural diagram of an access network device according to another embodiment of the present invention.

FIG. 5 is a schematic structural diagram of an access network device according to another embodiment of the present invention. As shown in FIG. 5, the access network device in this embodiment may include an obtaining unit 51 and a sending unit 52. The obtaining unit 51 is configured to obtain location information of a user equipment and congestion status information of a location region in which the user equipment is camping; and the sending unit 52 is configured to send a data packet to a gateway device, where the data packet includes the location information of the user equipment and the congestion status information of the location region in which the user equipment is camping, so that the gateway device performs congestion control on the user equipment according to the location information of the user equipment and the congestion status information of the location region in which the user equipment is camping.

The location region in which the user equipment is camping may include but is not limited to a cell, a cell group, a location area, a routing area, or a tracking area.

In this embodiment, an access network device sends a data packet to a gateway device by using a sending unit, where the data packet includes location information of a user equipment and congestion status information of a location region in which the user equipment is camping that are obtained by an obtaining unit, so that the gateway device can perform congestion control on the user equipment according to the location information of the user equipment and the congestion status information of the location region in which the user equipment is camping. Because the gateway device, unlike a gateway device that performs congestion control on all user equipments by using a same control policy in the prior art, performs congestion control on the user equipment according to a real-time location of the user equipment and a real-time congestion situation of the location region in which the user equipment is camping, thereby improving flexibility and accuracy of congestion control.

Another embodiment of the present invention further provides a congestion control system, including the gateway device provided by the embodiment corresponding to FIG. 4 and the access network device provided by the embodiment corresponding to FIG. 5.

It may be clearly understood by a person skilled in the art that, for convenience and brevity of description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be another division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, that is, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform a part of the steps of the methods described in the embodiments of the present invention. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

Finally, it should be noted that the foregoing embodiments are merely intended for describing the technical solutions of the present invention other than limiting the present invention. Although the present invention is described in detail with reference to the foregoing embodiments, a person of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. A congestion control method, comprising:
   receiving, by a gateway device, a data packet of a user equipment from an access network device, wherein the data packet comprises location information of the user equipment and congestion status information of a location region in which the user equipment is camping;
   obtaining, by the gateway device, a control policy corresponding to the location information of the user equipment;
   determining, by the gateway device, control information according to the control policy and the congestion status information of the location region in which the user equipment is camping; and
   performing, by the gateway device, congestion control on the data packet of the user equipment according to the control information.

2. The method according to claim 1, wherein the location region in which the user equipment is camping comprises a cell.

3. The method according to claim 1, wherein the location region in which the user equipment is camping comprises a cell group.

4. The method according to claim 1, wherein the location region in which the user equipment is camping comprises a location area.

5. The method according to claim 1, wherein the location region in which the user equipment is camping comprises a routing area.

6. The method according to claim 1, wherein the location region in which the user equipment is camping comprises a tracking area.

7. A gateway device, comprising:
a receiver, configured to receive a data packet of a user equipment from an access network device, wherein the data packet comprises location information of the user equipment and congestion status information of a location region in which the user equipment is camping; and
a processor, configured to obtain a control policy corresponding to the location information of the user equipment, to determine control information according to the control policy and the congestion status information of the location region in which the user equipment is camping, and to perforin congestion control on the user equipment according to the control information.

8. The gateway device according to claim 7, wherein the location region in which the user equipment is camping comprises a cell.

9. The gateway device according to claim 7, wherein the location region in which the user equipment is camping comprises a cell group.

10. The gateway device according to claim 7, wherein the location region in which the user equipment is camping comprises a location area.

11. The gateway device according to claim 7, wherein the location region in which the user equipment is camping comprises a routing area.

12. The gateway device according to claim 7, wherein the location region in which the user equipment is camping comprises a tracking area.

13. A non-transitory computer-readable media storing computer instructions for congestion control, that when executed by one or more processors, cause the one or more processors to perform the steps of:
receiving a data packet of a user equipment from an access network device, wherein the data packet comprises location information of the user equipment and congestion status information of a location region in which the user equipment is camping;
obtaining a control policy corresponding to the location information of the user equipment;
determining control information according to the control policy and the congestion status information of the location region in which the user equipment is camping; and
performing congestion control on the data packet of the user equipment according to the control information.

14. The non-transitory computer-readable media according to 13, wherein the location region in which the user equipment is camping comprises a cell.

15. The non-transitory computer-readable media according to 13, wherein the location region in which the user equipment is camping comprises a cell group.

16. The non-transitory computer-readable media according to 13, wherein the location region in which the user equipment is camping comprises a location area.

17. The non-transitory computer-readable media according to 13, wherein the location region in which the user equipment is camping comprises a routing area.

18. The non-transitory computer-readable media according to 13, wherein the location region in which the user equipment is camping comprises a tracking area.

* * * * *